United States Patent
Malladi

(10) Patent No.: US 8,576,807 B2
(45) Date of Patent: Nov. 5, 2013

(54) CHANNEL INTERLEAVING STRUCTURE FOR A WIRELESS COMMUNICATION SYSTEM

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1434 days.

(21) Appl. No.: 12/145,012

(22) Filed: Jun. 24, 2008

(65) Prior Publication Data

US 2008/0316977 A1 Dec. 25, 2008

Related U.S. Application Data

(60) Provisional application No. 60/946,107, filed on Jun. 25, 2007.

(51) Int. Cl.
  *H04B 7/216* (2006.01)
(52) U.S. Cl.
  USPC ............ 370/335; 370/338; 370/474; 370/344
(58) Field of Classification Search
  None
  See application file for complete search history.

(56) References Cited

U.S. PATENT DOCUMENTS

| 6,020,835 | A | 2/2000 | Hasegawa | |
| 7,385,949 | B1 * | 6/2008 | Botha | 370/329 |
| 7,925,956 | B2 * | 4/2011 | Nimbalker et al. | 714/755 |
| 8,358,988 | B2 * | 1/2013 | Martinot et al. | 455/187.1 |
| 2008/0298224 | A1 * | 12/2008 | Pi et al. | 370/204 |
| 2009/0158008 | A1 * | 6/2009 | Hepler et al. | 712/29 |

FOREIGN PATENT DOCUMENTS

| EP | 1489774 | 12/2004 |
| IL | 179800 | 5/2011 |
| RU | 2292654 C2 | 1/2007 |
| WO | 2004015948 A1 | 2/2004 |
| WO | 2004042987 A1 | 5/2004 |
| WO | 2005122458 | 12/2005 |

OTHER PUBLICATIONS

Linder H. et al., "A forward error correction based multicast transport protocol for multimedia applications in satellite environments," Performance, Computing, and Communications Conference, 1997. IEEE International Phoenix, Tempe, AZ. Feb. 5, 1997, p.
Qualcomm Europe, "Transmission of Coded Blocks across TTI," 3GPP TSG-RAN WG1 49-bis. Jun. 25, 2007, pp. 1-7.
International Search Report—PCT/US08/068237, International Search Authority—European Patent Office, Jan. 29, 2009.
Written Opinion—PCT/US08/068237, International Search Authority—European Patent Office, Jan. 29, 2009.
Qualcomm Europe: "Rate Matching for PDSCH and PUSCH" R1-071290, Mar. 30, 2007, pp. 1-9, XP002510978, 3GPP TSG-RAN WG1 #48-bis.
Taiwan Search Report—TW097123843—TIPO—Jan. 10, 2012.

\* cited by examiner

*Primary Examiner* — Duc C Ho
(74) *Attorney, Agent, or Firm* — Anthony R. Morris

(57) ABSTRACT

Systems and methodologies are described that facilitate employing a hybrid transmission structure in a wireless communication environment. Each transport block (e.g., MAC PDU) can be split into multiple code blocks. Moreover, each of the code blocks can be further divided into two or more code block segments. Further, code block segments from a given code block can be transmitted over a channel during disparate time slots of a subframe. Also, within a given subframe, code block segments corresponding to differing code blocks can be transmitted sequentially in time. Utilization of the foregoing can enable employment of a pipelined decoder structure at a receiver while allowing for optimization of time/frequency diversity.

26 Claims, 11 Drawing Sheets

CHANNEL INTERLEAVING STRUCTURE FOR A WIRELESS COMMUNICATION SYSTEM

CROSS-REFERENCE TO RELATED APPLICATIONS

This application claims the benefit of U.S. Provisional Patent application Ser. No. 60/946,107 entitled "METHOD AND APPARATUS FOR CHANNEL INTERLEAVING IN A WIRELESS COMMUNICATION" which was filed Jun. 25, 2007. The entirety of the aforementioned application is herein incorporated by reference.

BACKGROUND

I. Field

The following description relates generally to wireless communications, and more particularly to employing a channel interleaving structure that enhances time and frequency diversity while enabling pipelined decoding in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse, link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Various conventional transmission structures are commonly utilized by wireless communication apparatuses for transmitting data over a channel. For instance, a packet can be encoded and sent over the channel using a subset of time/frequency resources as set forth by these various conventional transmission structures. However, some conventional transmission structures can provide poor time diversity, which can be particularly problematic when channel conditions rapidly change (e.g., fast fading channel due to high speed movement of a wireless communication apparatus, . . . ). Moreover, other common transmission structures can offer poor frequency diversity. Still yet, some typical transmission structures can result in decoder related latency (e.g., decoding begins for a plurality of code blocks after an end of a subframe when reception of the plurality of code blocks simultaneously is completed, . . . ).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating employment of a hybrid transmission structure in a wireless communication environment. Each transport block (e.g., MAC PDU) can be split into multiple code blocks. Moreover, each of the code blocks can be further divided into two or more code block segments. Further, code block segments from a given code block can be transmitted over a channel during disparate time slots of a subframe. Also, within a given subframe, code block segments corresponding to differing code blocks can be transmitted sequentially in time. Utilization of the foregoing can enable employment of a pipelined decoder structure at a receiver while allowing for optimization of time/frequency diversity.

According to related aspects, a method that facilitates employing a hybrid transmission structure in a wireless communication environment is described herein. The method can include splitting a transport block into a plurality of code blocks. Moreover, the method can include dividing each of the plurality of code blocks into two or more respective code block segments. Further, the method can comprise transmitting a respective first code block segment associated with each of the plurality of code blocks in a first time slot of a subframe. The method can also include transmitting a respective second code block segment associated with each of the plurality of code blocks in a second time slot of the subframe.

Another aspect relates to a wireless communications apparatus. The wireless communications apparatus can include a memory that retains instructions related to transmitting a first set of code block segments corresponding to a set of code blocks, the first set of code block segments being transmitted sequentially in time during a first time slot of a subframe using a set of frequencies associated with a resource block, and transmitting a second set of code block segments corresponding to the set of code blocks, the second set of code block segments being transmitted sequentially in time during a second time slot of the subframe using the set of frequencies associated with the resource block. Further, the wireless communications apparatus can include a processor, coupled to the memory, configured to execute the instructions retained in the memory.

Yet another aspect relates to a wireless communications apparatus that enables utilizing a hybrid transmission structure in a wireless communication environment. The wireless communications apparatus can include means for splitting each code block associated with a transport block into two respective code block segments. Moreover, the wireless communications apparatus can include means for transmitting a first set of code block segments that includes one of the respective code block segments for each of the code blocks during a first time slot of a subframe and a second set of code block segments that includes the other of the respective code block segments for each of the code blocks during a second time slot of the subframe based upon a hybrid transmission structure.

Still another aspect relates to a computer program product that can comprise a computer-readable medium. The computer-readable medium can include code for splitting a transport block into a plurality of code blocks. Further, the computer-readable medium can include code for dividing each of the plurality of code blocks into two or more respective code block segments. Moreover, the computer-readable medium can include code for transmitting a respective first code block segment associated with each of the plurality of code blocks in a first time slot of a subframe. The computer-readable medium can also include code for transmitting a respective second code block segment associated with each of the plurality of code blocks in a second time slot of the subframe.

In accordance with another aspect, an apparatus in a wireless communication system can include a processor, wherein the processor can be configured to divide a transport block into code blocks. Further, the processor can be configured to split each of the code blocks into two respective code block segments. Moreover, the processor can be configured to transmit a first set of code block segments that includes one of the respective code block segments for each of the code blocks sequentially during a first time slot of a subframe and a second set of code block segments that includes the other of the respective code block segments for each of the code blocks sequentially during a second time slot of the subframe based upon a hybrid transmission structure.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
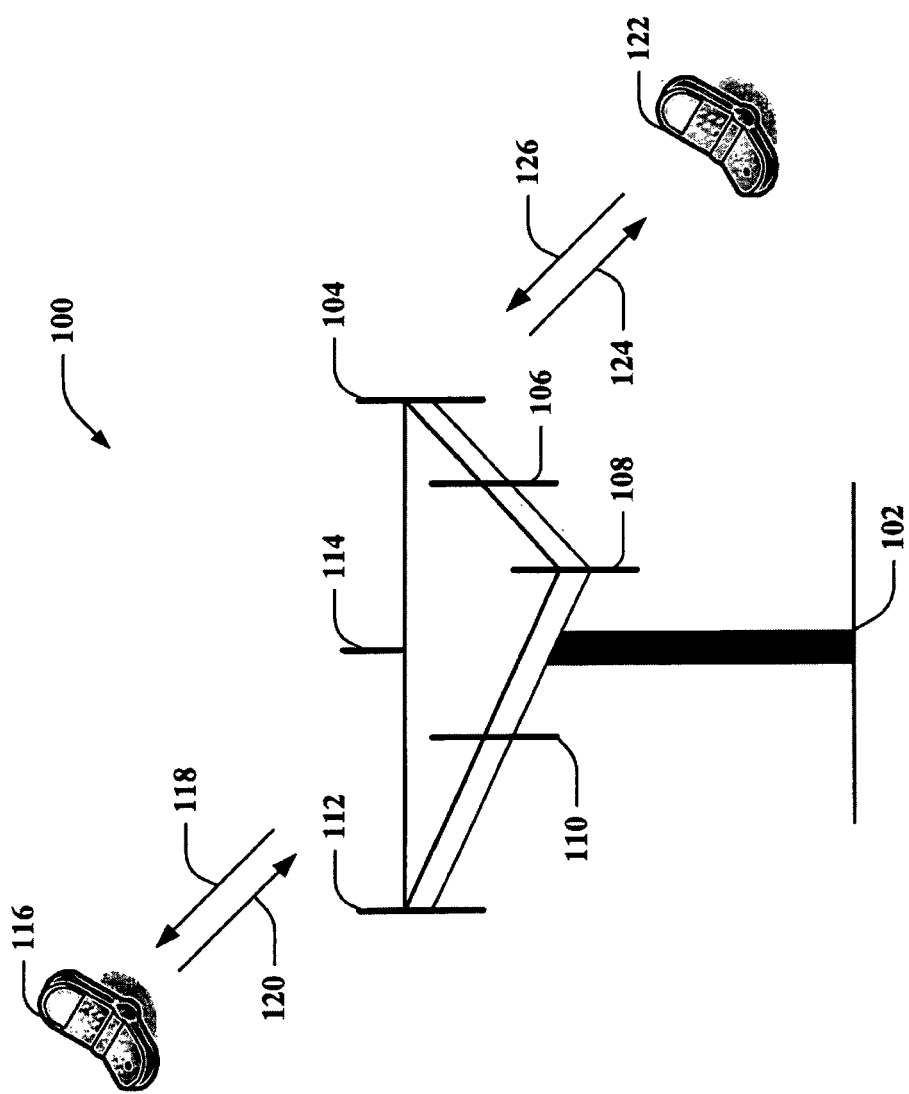
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Base station 102, access terminal 116, and/or access terminal 122 can be a transmitting wireless communication apparatus and/or a receiving wireless communication apparatus at a given time. When sending data, the transmitting wireless communication apparatus can encode data for transfer. More particularly, the transmitting wireless communication apparatus can have (e.g., generate, obtain, retain in memory, . . . ) a certain number of information bits to be sent over a channel to the receiving wireless communication apparatus. Such information bits can be included in a transport block of data (or a plurality of transport blocks) that can be segmented to yield a plurality of code blocks. Each of the plurality of code blocks can thereafter be further divided into at least two code block segments (e.g., code block parts, . . . ). The code blocks or code block segments can be encoded for transmission (e.g., to yield corresponding encoded code blocks or encoded code block segments, . . . ).

Moreover, a hybrid transmission structure can be utilized by the transmitting wireless communication apparatus for sending the encoded code block segments. Using the hybrid transmission structure, a first segment of a first code block can be sent during a first time slot within a subframe and a second segment of the first code block can be sent during a second time slot within the subframe. Both the first code block segment and the second code block segment can be transmitted using all frequency resources at respective, scheduled times during the corresponding time slots. Moreover, within a given time slot, segments from disparate code blocks can be transmitted sequentially in time. Thus, to enable a pipelined decoder structure at the receiving wireless communication apparatus while still allowing for maximum time/frequency diversity, code blocks are transmitted in both time slots of a subframe (e.g., disparate segments of each of the code blocks are sent in differing time slots of the subframe, . . . ), but segments of differing code blocks are transmitted serially within each time slot.

Figure 2:
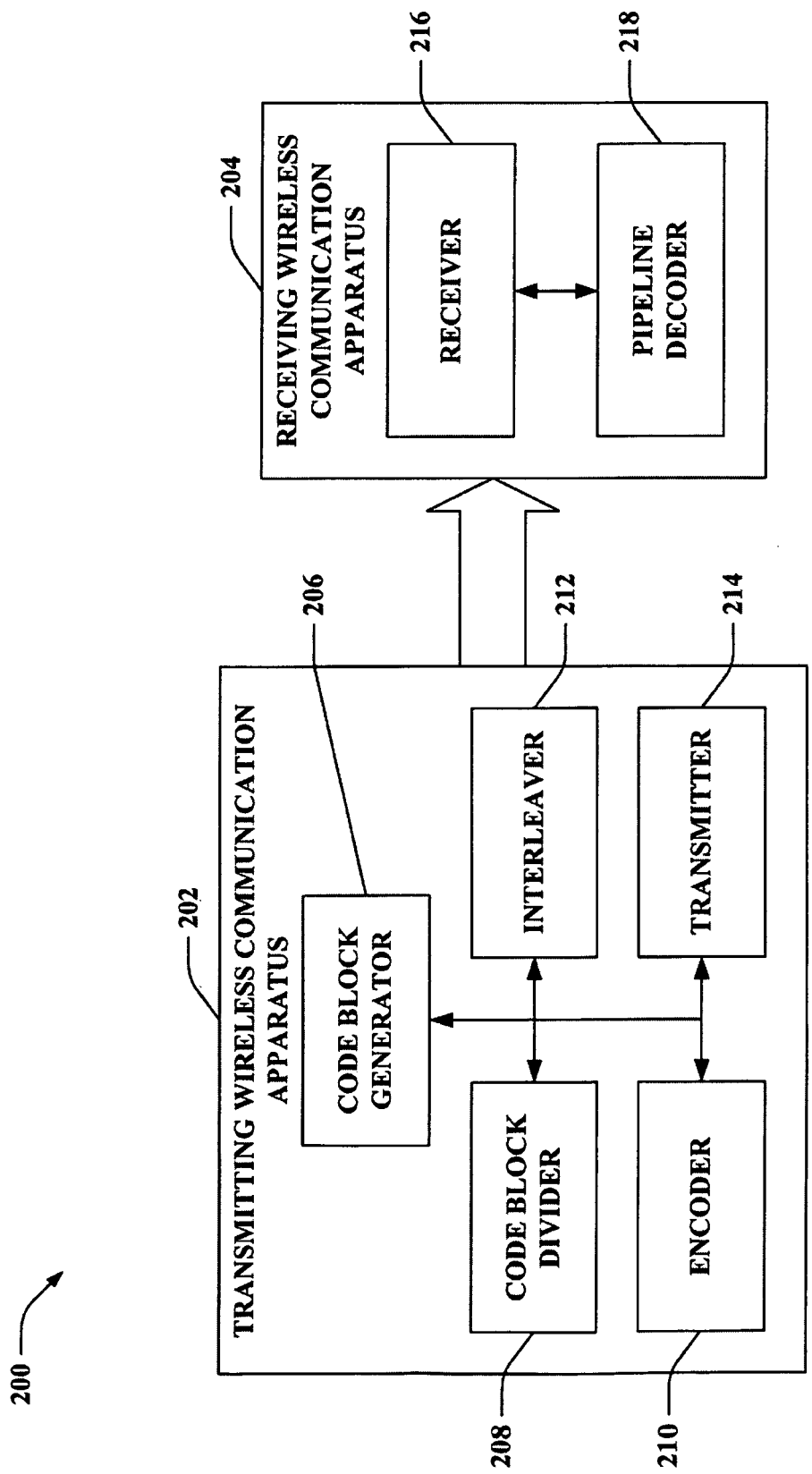
FIG. 2 is an illustration of an example system that employs a hybrid transmission structure in a wireless communication environment.

Now turning to FIG. 2, illustrated is a system 200 that employs a hybrid transmission structure in a wireless communication environment. System 200 includes a transmitting wireless communication apparatus 202 that transmits data via a channel to a receiving wireless communication apparatus 204. Although transmitting wireless communication apparatus 202 is depicted to be sending data to receiving wireless communication apparatus 204, it is to be appreciated that transmitting wireless communication apparatus 202 can be receiving data and/or receiving wireless communication apparatus 204 can be transmitting data (e.g., concurrently, at disparate times, . . . ). Hence, although not shown, it is to be appreciated that transmitting wireless communication apparatus 202 and receiving wireless communication apparatus 204 can be substantially similar. Transmitting wireless communication apparatus 202, for instance, can be a base station (e.g., base station 102 of FIG. 1, . . . ), an access terminal (e.g., access terminal 116 of FIG. 1, access terminal 122 of FIG. 1, . . . ), or the like. Moreover, receiving wireless communication apparatus 202 can be, for example, a base station (e.g., base station 102 of FIG. 1, . . . ), an access terminal (e.g., access terminal 116 of FIG. 1, access terminal 122 of FIG. 1, . . . ), etc.

According to an example, system 200 can be a Long Term Evolution (LTE) based wireless communication system; however, the claimed subject matter is not so limited. Further, it is to be appreciated that transmitting wireless communication apparatus 202 can send data over an uplink channel (e.g., Physical Uplink Shared Channel (PUSCH), . . . ) a downlink channel (e.g., Physical Downlink Shared Channel (PDSCH), . . . ), or the like as described herein. Pursuant to another illustration, transmitting wireless communication apparatus 202 and receiving wireless communication apparatus 204 can be peers, and thus, data can be transmitted as described herein in a peer-to-peer manner. The claimed subject matter, however, is not limited to the foregoing examples.

Transmitting wireless communication apparatus 202 can include a code block generator 206 that yields a plurality of code blocks from each transport block. For instance, a transport block (e.g., Media Access Control (MAC) Protocol Data Unit (PDU), . . . ) can be obtained by code block generator 206. Moreover, code block generator 206 can split the obtained transport block into multiple code blocks. For instance, a transport block can be segmented into M code blocks (e.g., code block 0, code block 1, . . . , code block M−1) by code block generator 206, where M can be substantially any integer. Further, a maximum size of each code block yielded by code block generator 206 can be 6 kilobits (e.g., 6016 bits, . . . ); however, the claimed subject matter is not so limited. Pursuant to an example, a size of a transport block received by code block generator 206 can be 24 kilobits; hence, code block generator 206 can split such transport block into four code blocks, each having a size of 6 kilobits. By way of another illustration, a size of a transport block obtained by code block generator 206 can be 12 kilobits, and thus, code block generator 206 can yield two code blocks, each having a size of 6 kilobits. It is to be appreciated, however, that the claimed subject matter is not limited to the aforementioned examples as it is contemplated that any transport block size(s) and/or any number of code blocks per transport block can be utilized in connection with system 200.

Transmitting wireless communication apparatus 202 can further include a code block divider 208 that splits each code block outputted by code block generator 206 into at least two code block segments. According to an example, code block divider 208 can separate a code block into two code block segments. By way of illustration, code block divider 208 can split a code block having a size of 6 kilobits into two code block segments, each having a size of 3 kilobits. Although the following describes code block divider 208 separating a code block into two code block segments, it is to be appreciated that code block divider 208 can divide a code block into more than two code block segments in accordance with another example.

Moreover, an encoder 210 that encodes data to be sent can be included in transmitting wireless communication apparatus 202. For example, code blocks yielded by code block generator 206 can be inputted to encoder 210, and thereafter, code block divider 208 can separate the encoded output corresponding to each inputted code block into at least two encoded, code block segments. According to another illustration, code block segments provided by code block divider 208 can be inputted to encoder 210. It is contemplated that substantially any type of encoder 210 can be utilized (e.g., turbo code encoder, . . . ).

Transmitting wireless communication apparatus 202 can also include an interleaver 212 and a transmitter 214. Interleaver 212 (e.g., channel interleaver, . . . ) can be a Quadratic Permutation Polynomial (QPP) Interleaver, however, the claimed subject matter is not so limited. Further, interleaver 212 can use a circular buffer based rate matching structure. With circular buffer based rate matching, each code block is rate matched separately, prior to transmission. The rate matched code blocks can thereafter be sent over the channel by transmitter 214 (e.g., to receiving wireless communication apparatus 204, . . . ).

Transmitter 214 can send the code blocks to receiving wireless communication apparatus 204 using a hybrid transmission structure (e.g., hybrid multiplexing structure, . . . ). In contrast, various conventional techniques utilize a serial transmission structure (e.g., serial multiplexing structure, . . . ) or a parallel transmission structure (e.g., parallel multiplexing structure, . . . ). With a serial transmission structure, each code block transmission is confined to a fraction of a subframe. According to an example with two code blocks, each code block could span 0.5 ms in the uplink when a serial transmission structure is used (e.g., assuming a subframe to have a duration of 1 ms, . . . ). Due to the confinement of code blocks to respective fractions of the subframe, in a high Doppler scenario, an effective signal-to-noise ratio (SNR) can be different across multiple code blocks. Moreover, with a parallel transmission structure, each code block transmission can span an entire subframe, and thus, the effective SNR can be substantially similar across multiple code blocks. However, a receiver cannot pipeline a demodulation process when the conventional parallel transmission structure is used; rather, demodulation of the transmitted code blocks can start at and/or after an end of a subframe when code block transfer is completed.

As set forth in the hybrid transmission structure, transmitter 214 can send each code block over the channel such that the code block spans both slots in a subframe (e.g., assuming that each subframe includes two slots, . . . ). For instance, a first code block segment of a code block as yielded by code block divider 208 can be transmitted using all available frequencies during a portion of a first time slot of a subframe, and a second code block segment of the code block as yielded by code block divider 208 can be transmitted using all available frequencies during a portion of the second time slot of the subframe. Further, within a slot, code block segments can be transmitted sequentially in time. Thus, a segment from code block 0 can be transmitted during the slot; upon completion of transmission related to such segment from code block 0, transmission can begin for a segment from code block 1, and so forth.

Receiving wireless communication apparatus 204 can further include a receiver 216 and a pipeline decoder 218. Receiver 216 can obtain code block segments transmitted from transmitting wireless communication apparatus 202, and provide the obtained code block segments to pipeline decoder 218. Pipeline decoder 218 can decode the obtained code block segments. Further, since the code block segments are transmitted sequentially in time within each slot, pipeline decoder 218 can begin to decode these segments upon receiving a complete code block segment. According to another illustration, pipeline decoder 218 can initiate decoding code blocks upon obtaining a complete code block (e.g., upon receiving a first code block segment and a second code block segment, both of which correspond to a common code block, . . . ). Thus, rather than having to wait until an end of a subframe, pipeline decoder 218 can initiate decoding of each of the code block segments (or each of the code blocks) at differing times based upon when such segments are communicated over the channel. Hence, receiving wireless communication apparatus 204 can pipeline the demodulation process, thereby reducing turn-around latency.

Figure 3:
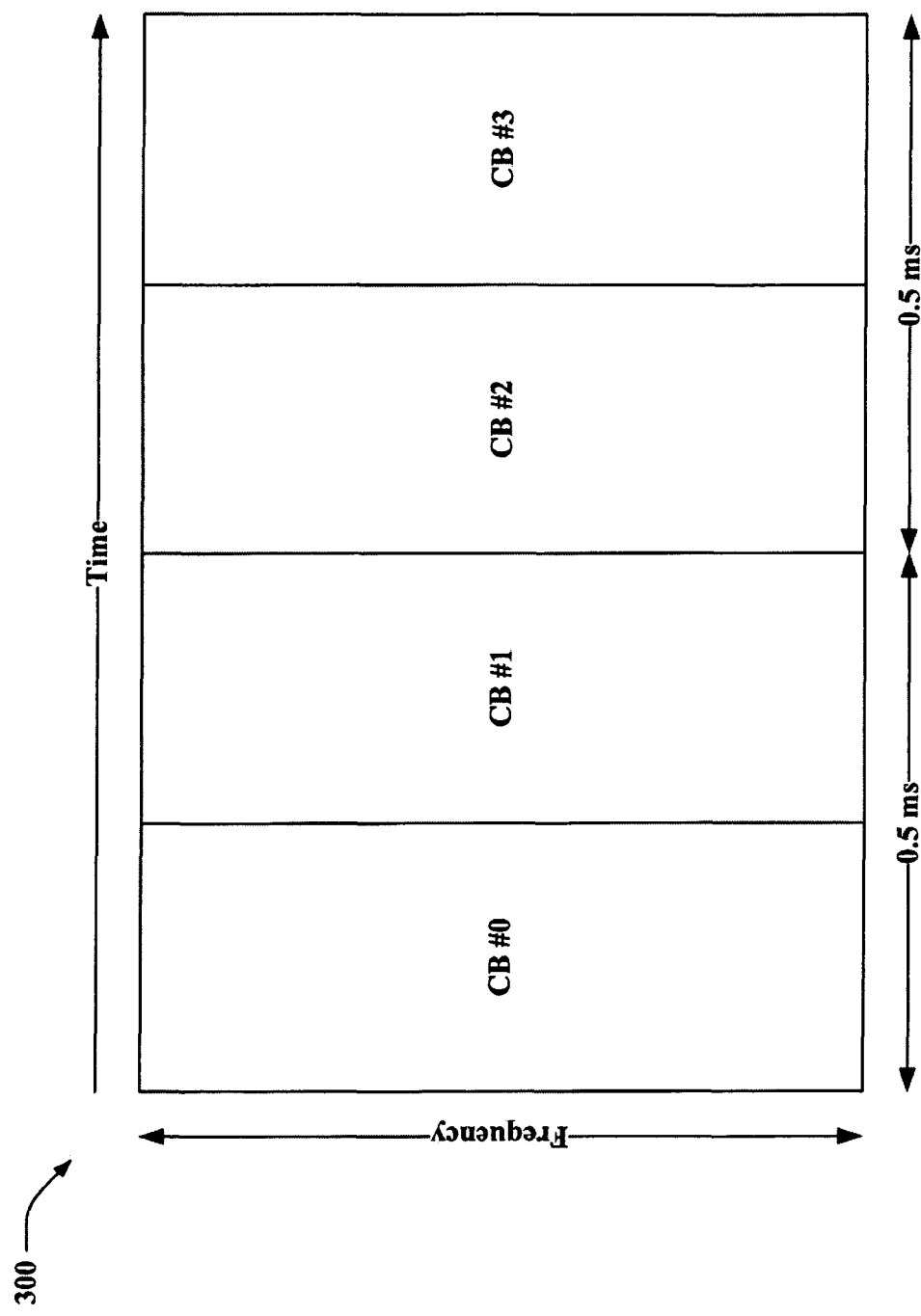
FIGS. 3-5 illustrate example transmission structures (e.g. multiplexing structures, . . . ) that can be utilized in accordance with various aspects of the subject disclosure.
Figure 4:
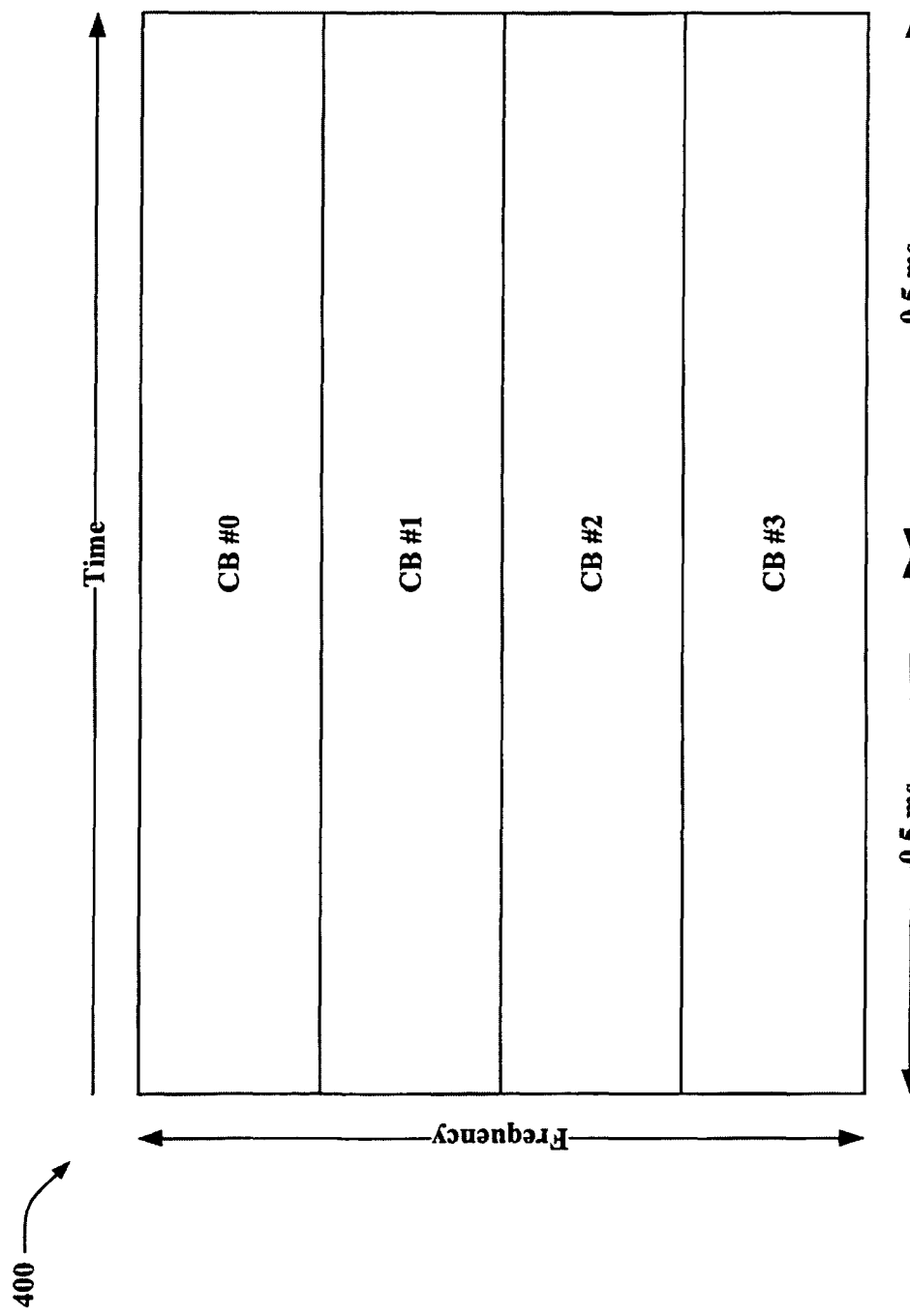
Figure 5:
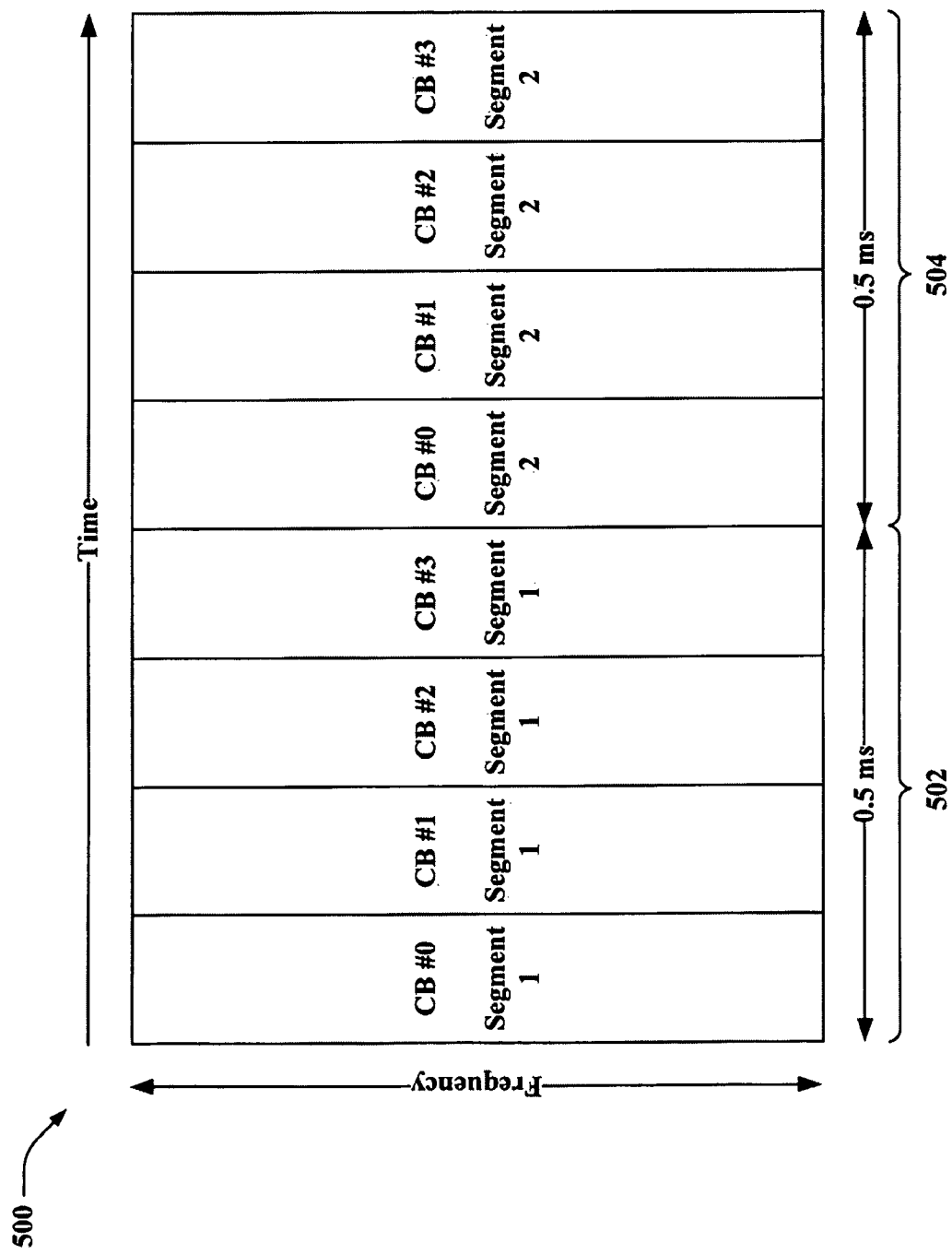

Referring to FIGS. 3-5, illustrated are example transmission structures (e.g., multiplexing structures, . . . ) that can be utilized in accordance with various aspects of the subject disclosure. For purposes of simplicity of explanation, each example depicts a resource block in the time and frequency dimensions that is equal in duration to one subframe or two consecutive slots (e.g. time slots, . . . ). Each of the consecutive slots of the subframe can be 0.5 ms in duration. Although not shown, the overall resource block can include a plurality of time/frequency resource elements (e.g., OFDM symbols at given tones, . . . ). Further, as shown in these examples, four code blocks (e.g., code block 0 (CB #0), code block 1 (CB #1), code block 2 (CB #2), and code block 3 (CB #3)) can be sent over a channel using these example transmission structures. The code blocks can be yielded from a transport block (e.g., a packet, . . . ) as described herein. For instance, a transport block can be divided into these four code blocks (e.g., a 24 kilobit transport block can be split into four 6 kilobit code blocks, . . . ). It is to be appreciated that FIGS. 3-5 are provided for illustrative purposes and the disclosed subject matter is not limited to the scope of these examples. For instance, it is contemplated that substantially any number of code blocks can be sent during a subframe, substantially any number of code block segments can be yielded from each code block, and so forth. According to another illustration, two or more transport blocks can be split to yield the four code blocks (e.g., two transport blocks can each be divided into two code blocks to provide the four code blocks in total, . . . ). By way of a further example, transport block(s) can be divided to generate the four code blocks as well as at least one additional code block (not shown) (e.g., the additional code block(s) can be sent as part of disparate subframe(s), inhibited from being transmitted, . . . ).

Turning to FIG. 3, illustrated is an example serial transmission structure 300. Four code blocks can be obtained by a transmitter (e.g., transmitter 214 of FIG. 2, . . . ) for sending over a channel (e.g., uplink channel, downlink channel, . . . ). When employing the serial transmission structure 300, each of the four code blocks can be sent sequentially. Thus, code block 0 can be transmitted first, followed by code block 1, then code block 2, and thereafter code block 3.

Each code block spans a quarter of the overall duration of the subframe (e.g., 0.25 ms, . . . ) when using the serial transmission structure 300 while using all (or most) frequencies associated with the resource block. With such sequential transmission, when fast fading channel conditions are experienced, the channel used for sending code block 0 during the first 0.25 ms of the subframe can be fundamentally different from the channel during second 0.25 ms of the subframe (e.g., when code block 1 is transmitted, . . . ), the channel during the third 0.25 ms of the subframe (e.g., when code block 2 is transmitted, . . . ), and/or the channel during the fourth 0.25 ms of the subframe (e.g., when code block 3 is transmitted, . . . ). Hence, each of the code blocks can be subjected to different channel conditions when transmitted. With such differing channel conditions, an entire packet (e.g., transport block code blocks 0-3, . . . ) may need to be retransmitted if any code block is in failure. Thus, performance when using the serial transmission structure 300 can be hampered since two code blocks from a common transport block can see different channels.

With reference to FIG. 4, illustrated is an example parallel transmission structure 400. With the parallel transmission structure 400, each code block spans the duration of the subframe (e.g., 1 ms, . . . ) to provide time diversity. The code blocks can therefore be sent over substantially similar channels (e.g., if one code block fails/is unable to be decoded than the other three code blocks would fail/be unable to be decoded leading to retransmission of the four code blocks, rather than retransmission of the four code blocks due to failure of one code block while the remaining code blocks are successfully decoded, . . . ). Thus, the four code blocks can concurrently be transmitted over the channel. However, each of the four code blocks can be sent using different frequencies. As shown, each code block can be allocated a quarter of the overall frequency band of the resource block, and thus, frequency diversity can be diminished when using the parallel transmission structure 400 in comparison to the serial transmission structure 300 of FIG. 3.

Moreover, when a transmitter employs the parallel transmission structure 400, a receiver obtains the four code blocks at the same time (e.g., reception is completed at an end of the subframe, . . . ). Thus, a decoder can sit idle for a period of time and wait until an end of the subframe to start demodulating the transmitted code blocks. In contrast, the serial transmission structure 300 of FIG. 3 can allow for a decoder to decode each code block as the code blocks are received; thus, a first code block can be received and decoding can begin thereupon, and by the time the first code block is decoded, the second code block can be received and decoding can begin thereupon, and so forth. With the parallel transmission structure 400, spikes in decoding volume can be experienced at the ends of subframes, yet similar time constraints during which decoding is to be effectuated can exist (e.g., leading to latency, more complexity associated with decoders, . . . ).

Now turning to FIG. 5, illustrated is an example hybrid transmission structure 500. As described herein, each code block can be divided into two code block segments. By way of illustration, a 24 kilobit transport block can be split into four code blocks, each having a size of 6 kilobits. Moreover, each the four code blocks can be further divided into two code block segments, each having a size of 3 kilobits. When using the hybrid transmission structure 500, a first segment of each of the code blocks can be sent during a first time slot 502 and a second segment of each of the code blocks can be sent during a second time slot 504. Moreover, within each time slot (e.g., within time slot 502, within time slot 504, . . . ), each code block segment can be transmitted sequentially. For example, within time slot 502, segment 1 of code block 0 can be transmitted, followed by segment 1 of code block 1, then segment 1 of code block 2, and thereafter segment 1 of code block 3. Similar sequential transmissions can be used for time slot 504 as depicted in FIG. 5.

From a receiver-side perspective (e.g., receiving wireless communication apparatus 204 of FIG. 2, . . . ), each code block arrives sequentially. A decoder (e.g., pipeline decoder 218 of FIG. 2, . . . ) can start decoding upon complete receipt of a code block (e.g., by receiver 216 of FIG. 2, . . . ). Thus, for instance, decoding can begin upon receiving an entirety of code block 0, and code block 1 can be received while code block 0 is being decoded, and so forth.

The hybrid transmission structure 500 preserves properties associated with both the serial transmission structure 300 and the parallel transmission structure 400. In particular, full frequency diversity can be provided by using the hybrid transmission structure 500. Moreover, beneficial aspects (e.g. pipelined decoding to reduce turn-around latency, high frequency diversity, . . . ) of the serial transmission structure 300 can be yielded by employing the hybrid transmission structure 500, while mitigating impact of channel differences since each code block can be transmitted with more similar channel conditions.

Based upon comparisons of the examples shown in FIGS. 3-5, the following can be noted. In the absence of intra-transmission time interval (TTI) frequency hopping, parallel transmission of coded blocks can provide the best performance at high Doppler. This can be due to additional frequency diversity achieved in parallel transmissions. For instance, the gain ranges can be from 0.7 dB to 0.9 dB at a 1% Block Error Rate (BLER) operating point for parallel transmissions compared to serial transmissions. However, the gain can diminish to 0.2 dB to 0.4 dB for parallel transmissions compared to hybrid transmissions as described herein. Thus, the hybrid transmission structure can provide performance more similar to the parallel transmission structure as compared to the serial transmission structure while providing benefits associated with the serial transmission structure. Further, it is to be noted that when intra-TTI frequency hopping is enabled, given that an acknowledgment (ACK) is transmitted per transport block, the constituent code blocks span both hops to maximize frequency diversity.

Figure 6:
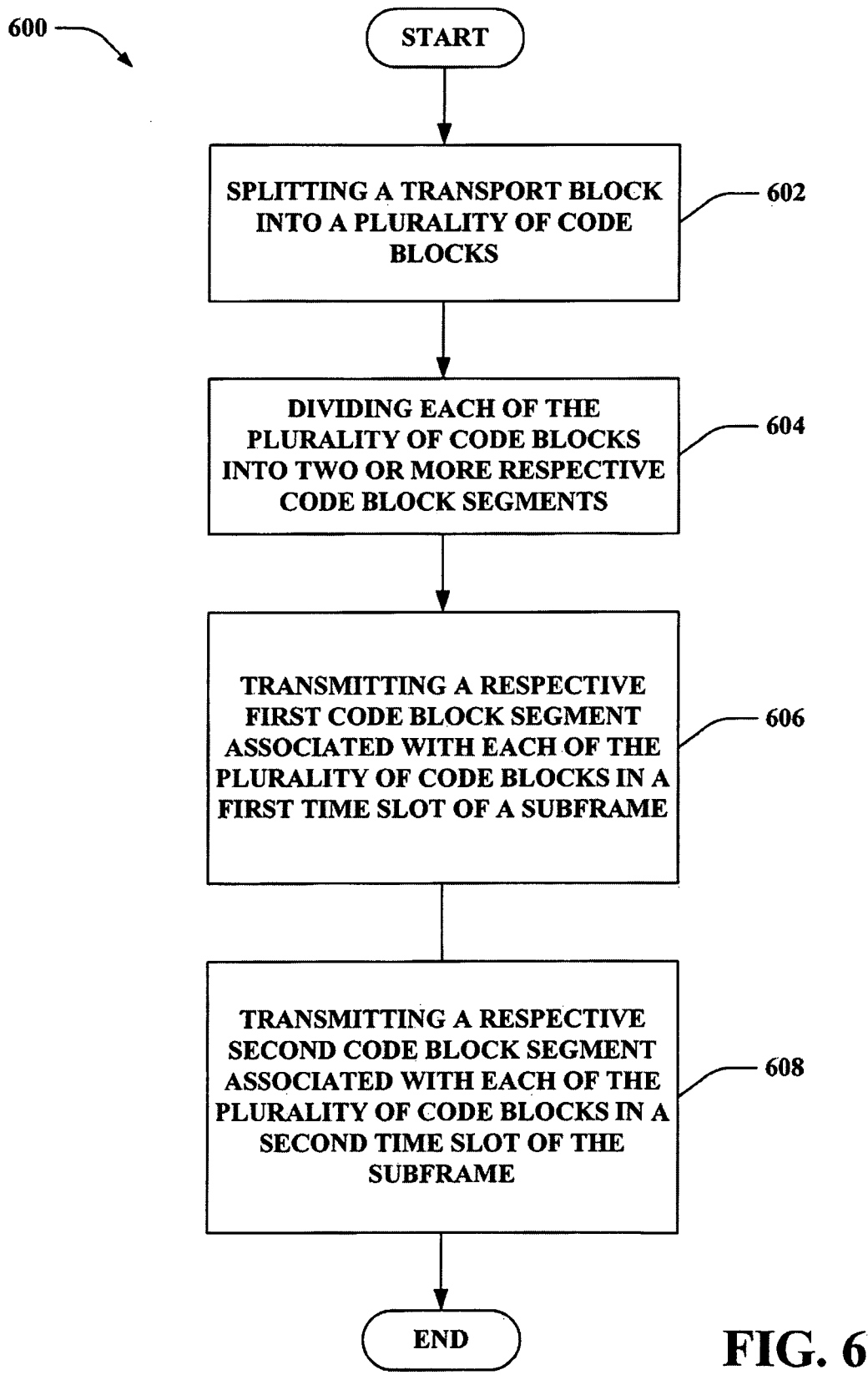
FIG. 6 is an illustration of an example methodology that facilitates employing a hybrid transmission structure in a wireless communication environment.
Figure 7:
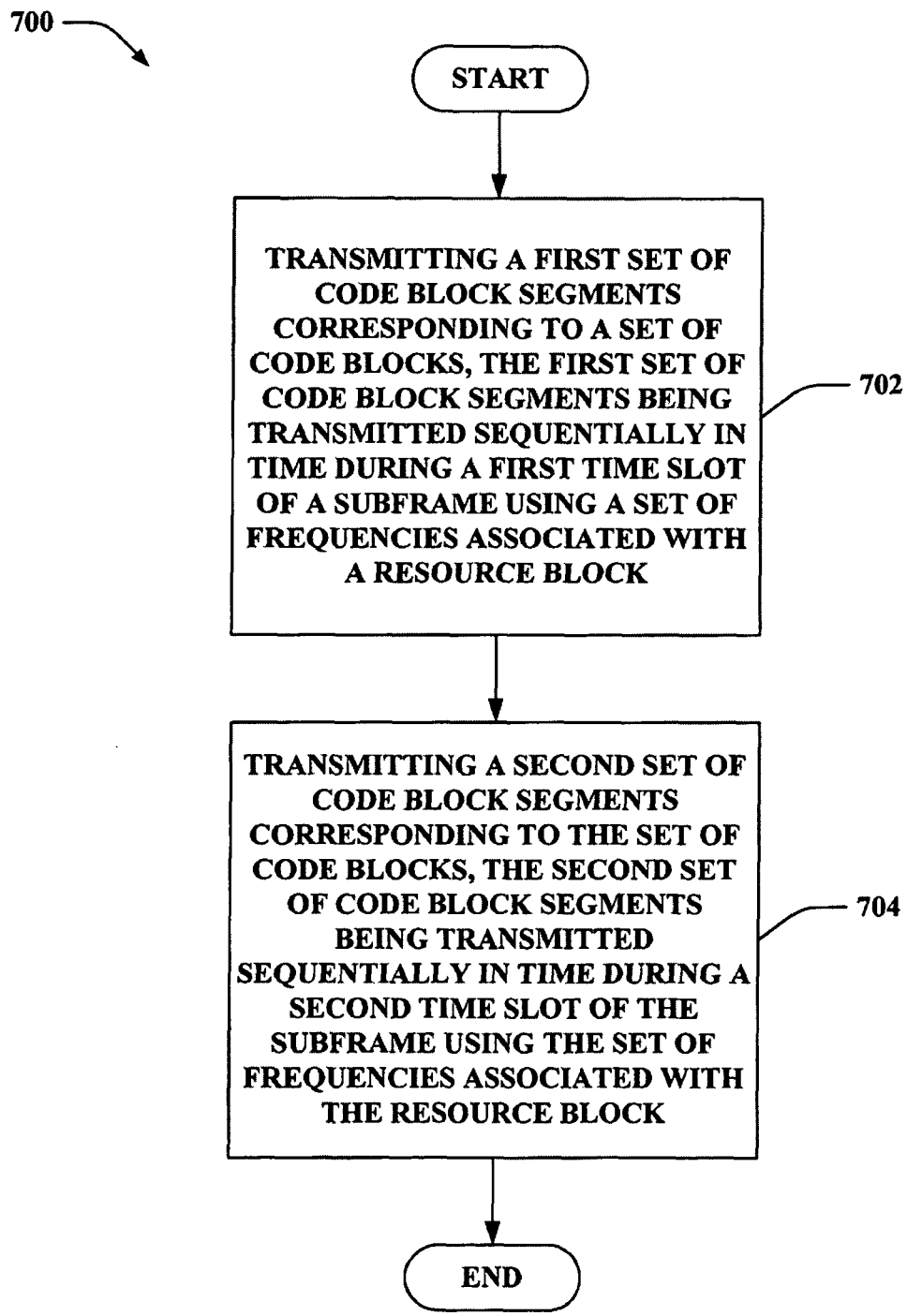
FIG. 7 is an illustration of an example methodology that enables a decoder to employ pipelined decoding while enhancing channel uniformity for disparate code blocks in a wireless communication environment.

Referring to FIGS. 6-7, methodologies relating to utilizing a hybrid transmission structure in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates employing a hybrid transmission structure in a wireless communication environment. For instance, the wireless communication environment can be a Long Term Evolution (LTE) based wireless communication environment. At 602, a transport block can be split into a plurality of code blocks. The transport block can be a Media Access Control (MAC) Protocol Data Unit (PDU), which can be provided to a physical layer for encoding. Further, according to an example, the transport block can be split into four code blocks. By way of another example, the transport block can be split into two code blocks. It is to be appreciated, however, that the transport block can be split into substantially any number of code blocks and the claimed subject matter is not limited to the aforementioned examples. Further, each of the plurality of code blocks can have a maximum size of 6 kilobits; however, it is contemplated that any size code blocks can be used. By way of illustration, a 24 kilobit transport block can be split into four code blocks, each with a size of 6 kilobits; yet, the claimed subject matter is not so limited.

At 604, each of the plurality of code blocks can be divided into two or more respective code block segments. For example, each code block can be divided into two code block segments (e.g., a code block can be split into code block segment 1 and code block segment 2, . . . ). Following this example, assuming that each code block has a size of 6 kilobits, then each code block segment can have a size of 3 kilobits.

At 606, a respective first code block segment associated with each of the plurality of code blocks can be transmitted in a first time slot of a subframe. The respective first code block segments can be transmitted sequentially in time during the first time slot. Thus, a first code block segment associated with a first code block can be transmitted in the first time slot, then a first code block segment associated with a second code block can be transmitted thereafter in the first time slot, and so forth. At 608, a respective second code block segment associated with each of the plurality of code blocks can be transmitted in a second time slot of the subframe. The respective second code block segments can be transmitted sequentially in time during the second time slot. Thus, a second code block segment associated with the first code block can be transmitted in the second time slot, then a second code block segment associated with the second code block can be transmitted thereafter in the first time slot, and so forth. Moreover, if the code blocks are divided into more than two respective code block segments, then these additional code block segments can similarly be transmitted during disparate time slot(s) of the subframe.

By transmitting the code block segments sequentially in time, a decoder at a receiver can effectuate pipelined decoding whereby each code block segment is decoded upon receipt (or upon receipt of a complete code block) and the code block segments are received at staggered times rather than simultaneously (e.g., at an end of a subframe as is the case for a parallel transmission structure, . . . ). Additionally, by transmitting code block segments of each of the plurality of code blocks in disparate time slots of the subframe, each code block can experience more similar channel conditions as compared to when a serial transmission structure is utilized. Moreover, the code block segments can each be sent using a full set of frequencies of a resource block (e.g., using all frequencies of the resource block to provide frequency diversity, . . . ). Further, the code block segments can be transmitted over an uplink channel (e.g., Physical Uplink Shared Channel (PUSCH), . . . ) or a downlink channel (e.g., Physical Downlink Shared Channel (PDSCH), . . . ).

Turning to FIG. 7, illustrated is a methodology 700 that enables a decoder to employ pipelined decoding while enhancing channel uniformity for disparate code blocks in a wireless communication environment. At 702, a first set of code block segments corresponding to a set of code blocks can be transmitted. The first set of code block segments can be transmitted sequentially in time during a first time slot of a subframe using a set of frequencies associated with a resource block. At 704, a second set of code block segments corresponding to the set of code blocks can be transmitted. The second set of code block segments can be transmitted sequentially in time during a second time slot of the subframe using the set of frequencies associated with the resource block. For instance, transmission of the first set and second set of code block segments can be effectuated in accordance with a hybrid transmission structure as described herein.

It will be appreciated that, in accordance with one or more aspects described herein, inferences can be made regarding employing a hybrid transmission structure. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or methods presented above can include making inferences pertaining to determining a type transmission structure (e.g., hybrid transmission structure, parallel transmission structure, serial transmission structure, . . . ) to utilize at a given time. By way of further illustration, an inference can be made related to determining a number of code blocks to form based upon a transport block. It will be appreciated that the foregoing examples are illustrative in nature and are not intended to limit the number of inferences that can be made or the manner in which such inferences are made in conjunction with the various embodiments and/or methods described herein.

Figure 8:
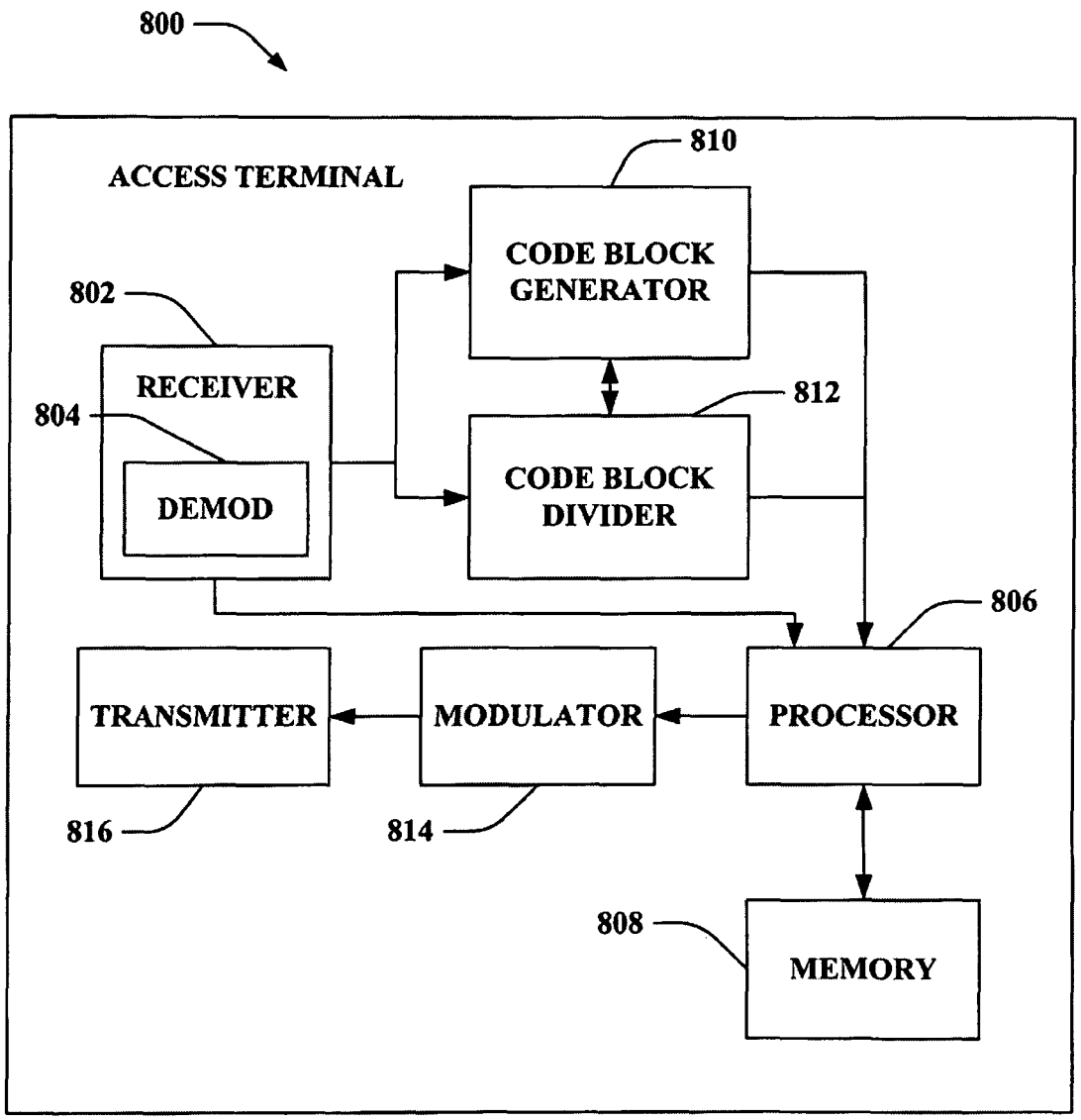
FIG. 8 is an illustration of an example access terminal that transmits data in accordance with a hybrid transmission structure in a wireless communication system.

FIG. 8 is an illustration of an access terminal 800 that transmits data in accordance with a hybrid transmission structure in a wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. For instance, memory 808 can store transport block(s) to be sent by access terminal 800 over a channel. Memory 808 can additionally store protocols and/or algorithms for encoding data included in the transport block(s), splitting the transport block(s) into code blocks, separating code blocks into code block segments, and the like. Further, memory 808 can store protocols and/or algorithms for decoding received code block segments in a pipelined manner.

It will be appreciated that the data store (e.g. memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a code block generator 810 and/or a code block divider 812, which can be substantially similar to code block generator 206 of FIG. 2 and code block divider 208 of FIG. 2, respectively. Code block generator 810 can divide a transport block into a plurality of code blocks (e.g., two, four, any integer, . . . ). Further, code block divider 812 can separate each of the plurality of code blocks into a plurality (e.g. two, more than two, . . . ) code block segments. Access terminal 800 still further comprises a modulator 814 and a transmitter 816 that transmits the signal to, for instance, a base station, another access terminal, etc. Transmitter 816 can employ the hybrid transmission structure as described herein when transmitting the code block segments over a channel (e.g., uplink channel, downlink channel, . . . ). Further, transmitter 816 can be substantially similar to transmitter 214 of FIG. 2. Although depicted as being separate from the processor 806, it is to be appreciated that code block generator 810, code block divider 812 and/or modulator 814 can be part of processor 806 or a number of processors (not shown).

Figure 9:
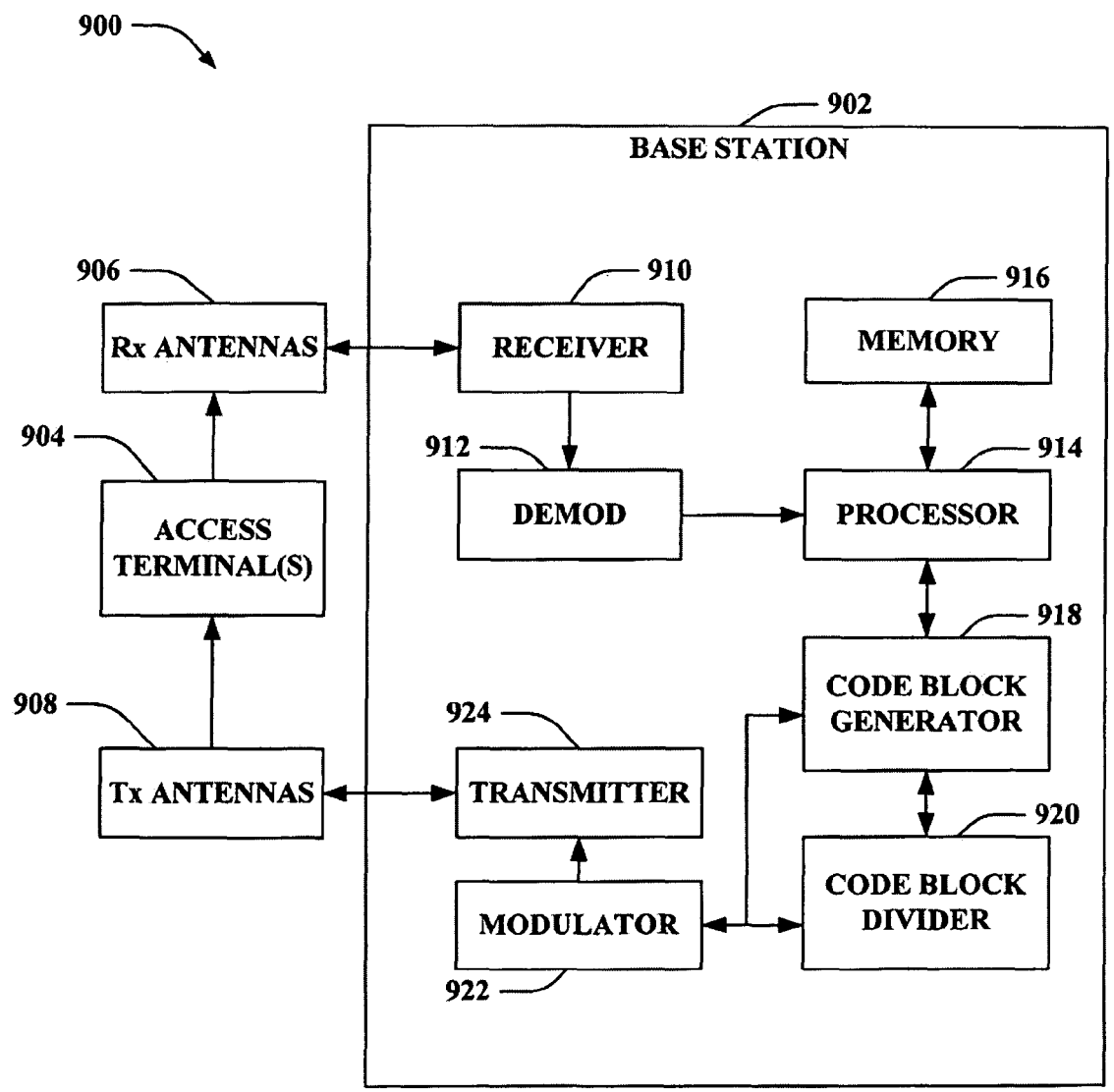
FIG. 9 is an illustration of an example system that uses a hybrid transmission structure for sending data in a wireless communication environment.

FIG. 9 is an illustration of a system 900 that uses a hybrid transmission structure for sending data in a wireless communication environment. System 900 comprises a base station 902 (e.g., access point, . . . ) with a receiver 910 that receives signal(s) from one or more access terminals 904 through a plurality of receive antennas 906, and a transmitter 924 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 (or a disparate base station (not shown)) and/or any other suitable information related to performing the various actions and functions set forth herein. Processor 914 is further coupled to a code block generator 918 that obtains transport block(s) and segments these transport block(s) into a plurality of code blocks. Code block generator 918 can be operatively coupled to a code block divider 920. Code block generator 918 can output the plurality of code blocks to code block divider 920. Further, code block divider 920 can split each of the plurality of code blocks into two or more respective code block segments. It is contemplated that code block generator 918 can be substantially similar to code block generator 206 of FIG. 2 and/or code block divider 920 can be substantially similar to code block divider 208 of FIG. 2. Further, code block generator 918 and/or code block divider 920 can provide information to be transmitted to a modulator 922. Modulator 922 can multiplex a frame for transmission by a transmitter 924 through antennas 908 to access terminal(s) 904. Moreover, transmitter 924, which can be substantially similar to transmitter 214 of FIG. 2, can send code block segments yielded by code block divider 920 based upon a hybrid transmission structure. Although depicted as being separate from the processor 914, it is to be appreciated that code block generator 918, code block divider 920 and/or modulator 922 can be part of processor 914 or a number of processors (not shown).

Figure 10:
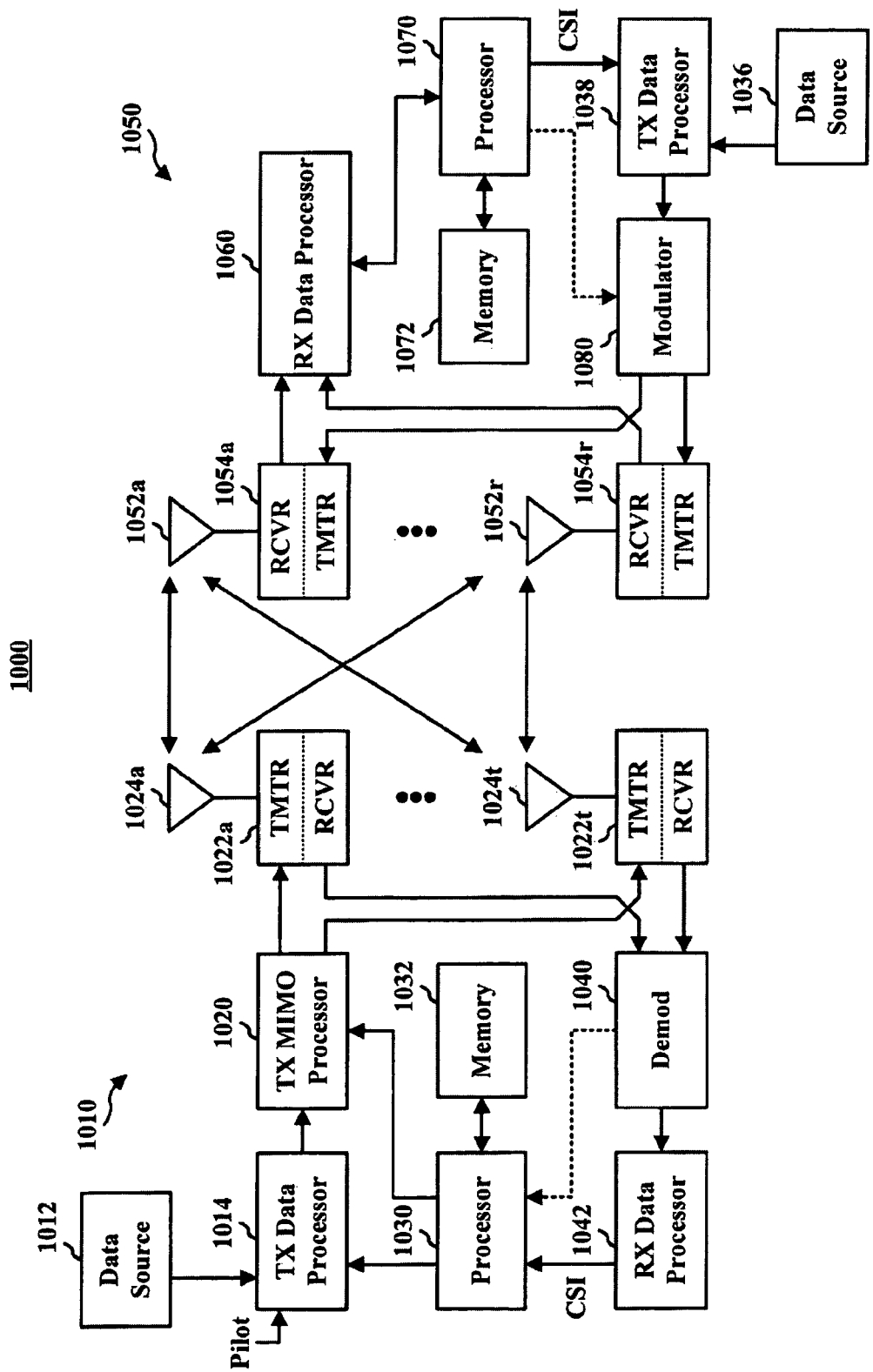
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1, 2, 8-9, and 11) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g. for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters, 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and down-converts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, Parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
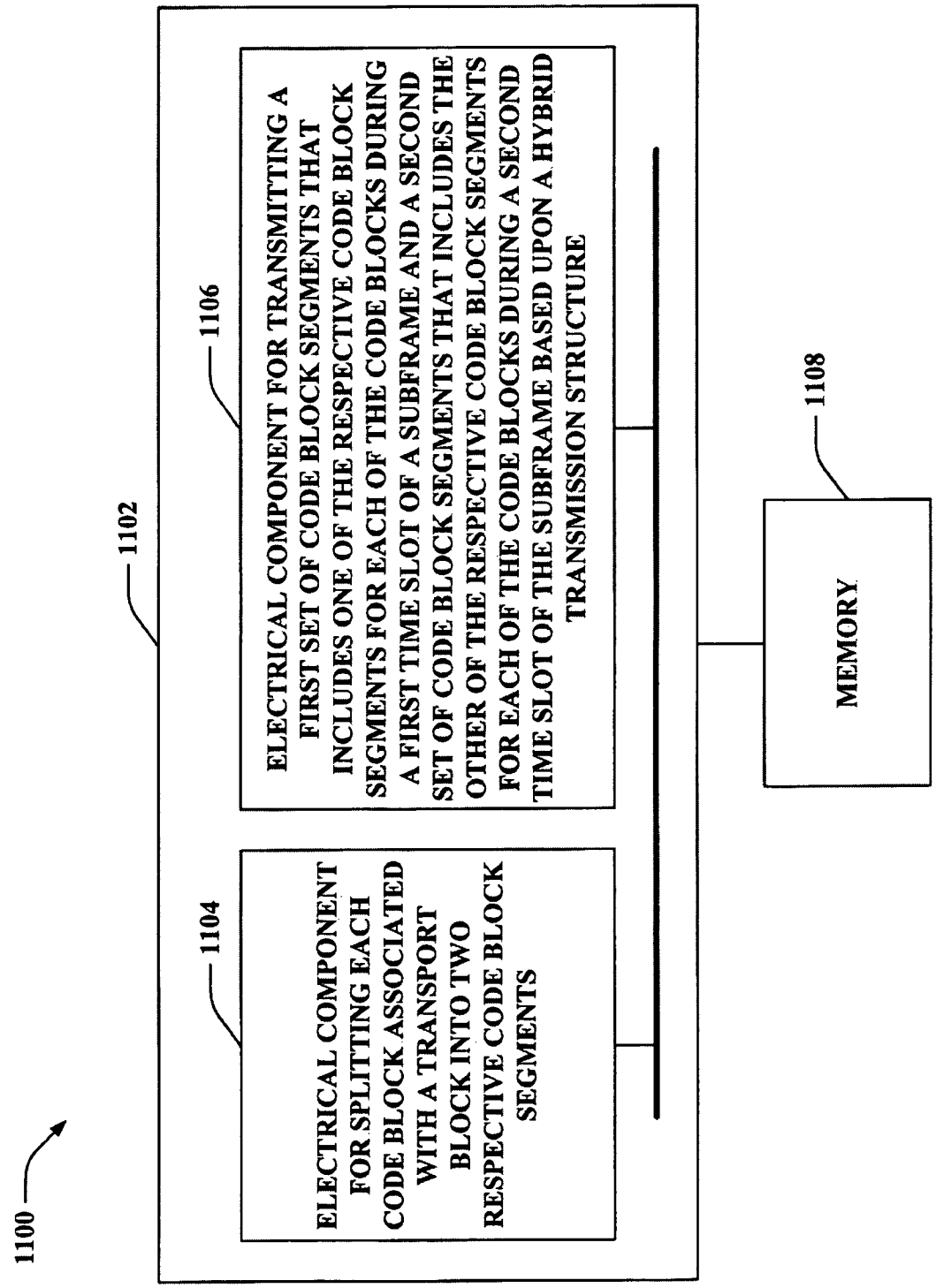
FIG. 11 is an illustration of an example system that enables utilizing a hybrid transmission structure in a wireless communication environment.

With reference to FIG. 11, illustrated is a system 1100 that enables utilizing a hybrid transmission structure in a wireless communication environment. For example, system 1100 can reside at least partially within an access terminal. According to another illustration, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for splitting each code block associated with a transport block into two respective code block segments 1104. For example, the transport block can yield a total of eight code block segments; however, the claimed subject matter is not so limited. Further, although not shown, logical grouping 1102 can include an electrical component for dividing the transport block into the code blocks. Moreover, logical grouping 1102 can include an electrical component for transmitting a first set of code block segments that includes one of the respective code block segments for each of the code blocks during a first time slot of a subframe and a second set of code block segments that includes the other of the respective code block segments for each of the code blocks during a second time slot of the subframe based upon a hybrid transmission structure 1106. Thus, each of the code blocks can span both slots of the subframe (e.g., transmission time interval (TTI), . . . ). Moreover, within each of the slots, code block segments from code blocks can be transmitted sequentially in time. Additionally, system 1100 can include a memory 1108 that retains instructions for executing functions associated with electrical components 1104 and 106. While shown as being external to memory 1108, it is to be understood that one or more of electrical components 1104 and 1106 can exist within memory 1108.

What has been described above, includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates employing a hybrid transmission structure in a wireless communication environment, comprising:
    splitting a transport block into a plurality of code blocks;
    dividing each of the plurality of code blocks into two or more respective code block segments;
    transmitting a respective first code block segment associated with each of the plurality of code blocks in a first time slot of a subframe; and
    transmitting a respective second code block segment associated with each of the plurality of code blocks in a second time slot of the subframe.

2. The method of claim 1, wherein the transport block is a Media Access Control (MAC) Protocol Data Unit (PDU) that is provided to a physical layer for encoding.

3. The method of claim 1, further comprising:
splitting the transport block into four code blocks;
dividing each of the four code blocks into two code block segments;
transmitting a first four code block segments during the first time slot of the subframe, the first four code block segments include a first one of the code block segments for each of the four code blocks; and
transmitting a second four code block segments during the second time slot of the subframe, the second four code block segments include a second one of the code block segments for each of the four code blocks.

4. The method of claim 1, further comprising:
transmitting the respective first code block segments sequentially in time during the first time slot; and
transmitting the respective second code block segments sequentially in time during the second time slot.

5. The method of claim 1, further comprising transmitting each of the respective first code block segments and each of the second code block segments at staggered times to enable a decoder at a receiver to effectuate pipelined decoding.

6. The method of claim 1, further comprising transmitting the two or more respective code block segments corresponding to each of the plurality of code blocks in disparate time slots of the subframe.

7. The method of claim 1, further comprising transmitting each of the respective first code block segments and each of the respective second code block segments using a full set of frequencies of a resource block.

8. A wireless communications apparatus, comprising:
a memory that retains instructions related to transmitting a first set of code block segments corresponding to a set of code blocks, the first set of code block segments being transmitted sequentially in time during a first time slot of a subframe using a set of frequencies associated with a resource block, and transmitting a second set of code block segments corresponding to the set of code blocks, the second set of code block segments being transmitted sequentially in time during a second time slot of the subframe using the set of frequencies associated with the resource block; and
a processor, coupled to the memory, configured to execute the instructions retained in the memory.

9. The wireless communications apparatus of claim 8, wherein the memory further retains instructions related to splitting a transport block to form the set of code blocks, and dividing each code block in the set of code blocks into two code block segments.

10. The wireless communications apparatus of claim 9, wherein the transport block is a Media Access Control (MAC) Protocol Data Unit (PDU) that is provided to a physical layer for encoding.

11. The wireless communications apparatus of claim 8, wherein the memory further retains instructions related to transmitting each code block segment in the first set of code block segments and the second set of code block segments at disparate times to enable a decoder at a receiver to effectuate pipelined decoding.

12. The wireless communications apparatus of claim 8, wherein the set of frequencies associated with the resource block includes all frequencies of the resource block.

13. A wireless communications apparatus that enables utilizing a hybrid transmission structure in a wireless communication environment, comprising:
means for splitting each code block associated with a transport block into two respective code block segments; and
means for transmitting a first set of code block segments that includes one of the respective code block segments for each of the code blocks during a first time slot of a subframe and a second set of code block segments that includes the other of the respective code block segments for each of the code blocks during a second time slot of the subframe based upon a hybrid transmission structure.

14. The wireless communications apparatus of claim 13, further comprising means for dividing the transport block into the code blocks.

15. The wireless communications apparatus of claim 13, wherein the transport block is a Media Access Control (MAC) Protocol Data Unit (PDU) that is provided to a physical layer for encoding.

16. The wireless communications apparatus of claim 13, wherein the first set of code block segments are transmitted sequentially in time during the first time slot and the second set of code block segments are transmitted sequentially in time during the second time slot.

17. The wireless communications apparatus of claim 13, wherein each code block segment in the first set of code block segments and the second set of code block segments is transmitted at a unique, respective time to enable a decoder at a receiving wireless communication apparatus to effectuate pipelined decoding.

18. The wireless communications apparatus of claim 13, wherein each code block segment in the first set of code block segments and the second set of code block segments is transmitted using a full set of frequencies of a resource block.

19. A computer program product, comprising:
a non-transitory computer-readable medium comprising:
code for splitting a transport block into a plurality of code blocks;
code for dividing each of the plurality of code blocks into two or more respective code block segments;
code for transmitting a respective first code block segment associated with each of the plurality of code blocks in a first time slot of a subframe; and
code for transmitting a respective second code block segment associated with each of the plurality of code blocks in a second time slot of the subframe.

20. The computer program product of claim 19, wherein the transport block is a Media Access Control (MAC) Protocol Data Unit (PDU) that is provided to a physical layer for encoding.

21. The computer program product of claim 19, the non-transitory computer-readable medium further comprising:
code for splitting the transport block into four code blocks;
code for dividing each of the four code blocks into two code block segments;
code for transmitting a first four code block segments during the first time slot of the subframe, the first four code block segments include a first one of the code block segments for each of the four code blocks; and
code for transmitting a second four code block segments during the second time slot of the subframe, the second four code block segments include a second one of the code block segments for each of the four code blocks.

22. The computer program product of claim 19, the non-transitory computer-readable medium further comprising:
code for transmitting the respective first code block segments sequentially in time during the first time slot; and
code for transmitting the respective second code block segments sequentially in time during the second time slot.

23. The computer program product of claim 19, the non-transitory computer-readable medium further comprising code for transmitting each of the respective first code block segments and each of the second code block segments at staggered times to enable a decoder at a receiver to effectuate pipelined decoding.

24. The computer program product of claim 19, the non-transitory computer-readable medium further comprising code for transmitting the two or more respective code block segments corresponding to each of the plurality of code blocks in disparate time slots of the subframe.

25. The computer program product of claim 19, the non-transitory computer-readable medium further comprising code for transmitting each of the respective first code block segments and each of the respective second code block segments using a full set of frequencies of a resource block.

26. In a wireless communications system, an apparatus comprising:
- a processor configured to:
    - divide a transport block into code blocks;
    - split each of the code blocks into two respective code block segments; and
    - transmit a first set of code block segments that includes one of the respective code block segments for each of the code blocks sequentially during a first time slot of a subframe and a second set of code block segments that includes the other of the respective code block segments for each of the code blocks sequentially during a second time slot of the subframe based upon a hybrid transmission structure.

* * * * *